Feb. 25, 1964    E. J. TRENTINI    3,122,330
ARC REFLECTORS
Filed Dec. 11, 1961

INVENTOR
Ernest J. Trentini
BY
*Frederick Shope*
ATTORNEY

United States Patent Office 3,122,330
Patented Feb. 25, 1964

3,122,330
ARC REFLECTORS
Ernest J. Trentini, R.D. 2, Box 394–B, Clairton, Pa.
Filed Dec. 11, 1961, Ser. No. 158,402
4 Claims. (Cl. 240—47)

This invention relates to improved arc reflectors, and in particular to electric arc reflectors in motion picture projectors.

Present day motion picture projectors commonly employ an electric arc light source produced between the tips of carbon rods and a concave mirror disposed behind and associated with respect to the electric arc so as to collect the light therefrom and to reflect the light to a focal point ahead of the electric arc. Film passed near this focal point is illuminated substantially uniformly over each complete frame by the light reflected by the mirror and a projection lens then projects the resulting picture on a screen. Glass mirrors are used in the projectors.

The intensity of the light illuminating the film and the brightness of the resulting screen picture are dependent on the efficiency of the concave reflector mirror. The concave mirrors used in projectors for outdoor moving picture exhibitions may be 18 inches in diameter and their cost may be several hundreds of dollars. The surface of the concave mirror is located only a few inches from the intense electrical arc and it is subjected to substantial temperature variations. Cracking of the mirror occurs at times, requiring replacement with a new mirror.

Equally serious to the problem of cracking of the mirror, is the spattering and coating of the mirror with sputter products from the arc carbons. Pieces of incandescent carbon may be hurled with considerable velocity and the metal jacket on some of the carbon rods will be molten and the molten metal will spatter the mirror. Smut will coat the mirror and reduce its reflectivity appreciably with the passage of time. Eventually the mirror must be replaced in a matter of some months of use.

It has been suggested in the prior art that a flat plate of quartz be disposed between the mirror and the electrical arc to protect the mirror. Apart from the high cost of quartz, which will approach that of a mirror, the sputtering and smutting of the flat quartz plate is far greater than would occur on the concave mirror because of the proximity of the flat plate to the arc. Further, the use of less expensive glass rather than quartz is not feasible, since from tests it has been found that a glass plate disposed within 1 to 2 inches of the arc will crack within minutes after the electrical arc is established. In all cases, a flat plate dissipates a substantial portion of the light of the arc so that the net light on the film is significantly reduced.

The object of the present invention is to provide a composite reflector comprising a concave mirror and a concave, closely spaced readily replaceable glass reflector shield in association with an electrical arc.

A further object of the invention is to provide a composite reflector for electric arc projectors wherein a concave mirror is mounted behind the arc and a spaced transparent glass reflector shield is fastened by readily detachable means a spaced distance in front of the mirror, along with means to enable cooling air flow to circulate between the mirror and the reflector shield as well as over the front surface of the reflector shield.

Another object of this invention is to provide a glass reflector shield member adapted to fit in front of a motion picture projector mirror, the member having a lower cut out portion and a flared lip at its upper portion to allow the flow of cooling air over its surfaces.

A still further object is to provide a composite reflector embodying a mirror that will remain clean and last indefinitely.

Other objects of the invention will in part be obvious and will in part appear hereinafter.

For a better understanding of the nature and objects of the invention reference should be had to the following detailed description and drawing in which—

Figure 1:
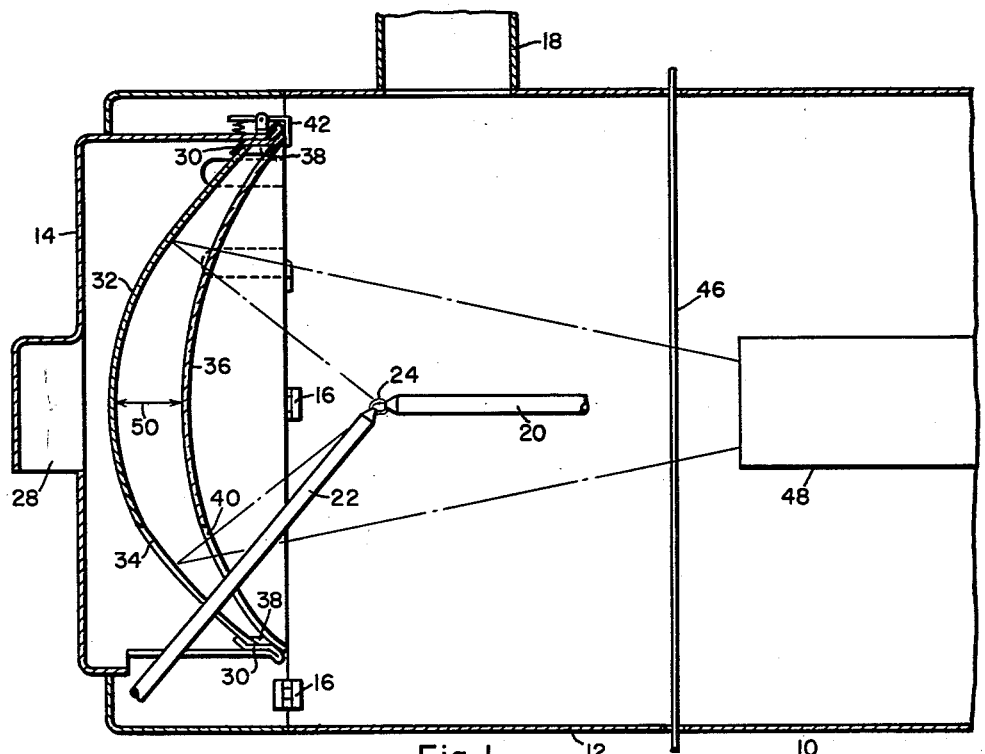
FIGURE 1 is a vertical cross section of a composite reflector according to one form of the invention.

In accordance with the present invention a composite reflector for electrical arc projectors is produced that provides not only a higher light output when new, but enables a higher light output at all subsequent times than presently known mirrors. Furthermore, the mirror component of the composite reflector will remain clean and unblemished in normal use and will last indefinitely.

More particularly, the composite reflector comprises (1) a relatively permanent concave mirror of glass provided on its back surface with a suitable reflective coating and (2) a readily replaceable concave transparent reflector shield of essentially the same diameter as the mirror and comprised of a relatively inexpensive glass, held in position a small distance from the main surface of the mirror. The curvature of the reflector shield is generally on slightly longer radii than the mirror, and it will reflect a portion of the light from the arc upon the film.

The mirror proper may be supported more or less permanently in a pivoted or movable housing to the rear of the electrical arc. Quick release means are preferably employed to fasten the reflector shield component in a position with the peripheries in contact or slightly spaced therefrom while the main surfaces are separated a slight distance from the mirror so that a current of air will pass between two cut-out portions at the front surface thereof which also accommodate one of the arc carbons. The periphery of the reflector shield is so shaped and disposed with respect to the mirror that such air may flow from between the two and escape readily at a peripheral portion between the mirror and the reflector shield.

As an example of the invention, reference should be had to the drawing, wherein, as shown, a portion of a motion picture projector 10 comprising an enclosure 12, which includes a movable mounting 14 pivoted on a hinge 16, and a flue 18 for escape of hot gases. A horizontal carbon 20 and an angled carbon 22 are disposed on movable means (not shown) in the enclosure 12 so that an electrical arc 24 may be drawn at their tips at a relatively fixed point.

The movable mounting 14 includes a projection with a relatively large port 28 to enable cooling air to be drawn into the enclosure 12. Locating means comprising lugs 30 are disposed within the mounting 14 to enable a concave mirror 32 to be supported therein. Suitable holding means may be employed to retain the mirror 32 in position on the lugs 30. The bottom edge of the mirror is cut out at 34 to provide a passage for the cooling air to pass from the back to the front of the mirror 30.

Spaced a brief distance from the mirror 32 is a reflector shield 36 of transparent relatively inexpensive glass. Lime glass, soda glass and borate glass may be employed for this purpose. Spacers 38 provide a peripheral separation of the order of 1/8 inch to 1/2 inch between mirror 30 and reflector shield 36. Spring latches 42 enable the easy and rapid removal and changing of the reflector shield. A cut out portion 40 is provided at the lower end of the reflector shield to enable a portion of the cooling air to pass through.

The radius of curvature of the mirror 32 is such that light from the arc 24 is gathered thereon and reflected to a focal point a substantial distance forward of the carbons where it impinges on a film 46 and thence to a projection lens 48.

The radius of curvature of the reflector shield is slightly greater than that of the mirror so that at their centers there is a separation 50 of about an inch. A portion of the light from the arc 24 will be reflected from the front surface of the reflector shield and will also be directed at the film 46.

The reflector shield may be readily prepared by heating a flat sheet of glass to the softening point of the glass and placing it on a shaped metal mold where it will assume the desired curvature and then cool.

Figures 2, 3:
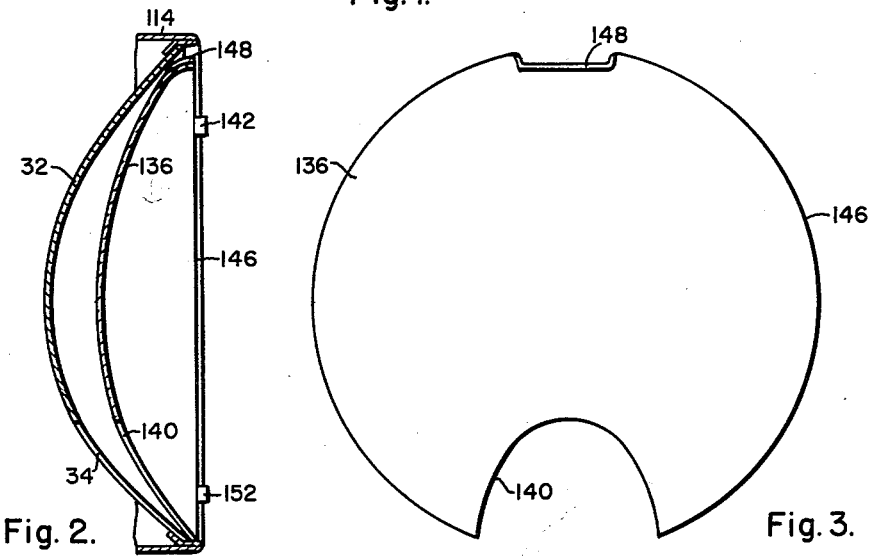
FIGURE 2 is a cross-section through a modified form of the invention.
FIGURE 3 is a view in elevation of the modified form of the reflector shield.

A modified form of reflector shield which gives good results is the member 136 shown in FIGS. 2 and 3. The concave reflector shield 136 has its periphery shaped to fit generally upon the peripheral edge of the mirror 32. A lower cut out portion 140 in the shield 136 is similar in size and shape to the cut out portion 34 of the mirror. To mount the reflector shield 136 in place, fixed flanged lugs 152 are disposed on the lower sides of the movable mounting 114 so that the shield can be slipped in behind them. A pair of spring latches 142 similar to latch 42 in FIG. 1 are mounted on either upper side of the mounting 114 and enable the reflector shield to be readily removed or inserted into place in front of the mirror 32.

At the upper portion the reflector shield 136 is provided with a relatively wide flared lip 148, the flange being directed toward its longitudinal axis, which provides a space for the cooling air to escape from between the mirror 32 and shield 136.

One of the advantages of the modified construction of FIGS. 2 and 3 is that the reflector shield 136 can be applied with but little fitting to any conventional motion picture projector. In some cases the regular latches which hold the mirror in place will accommodate the reflector shield, requiring at most a slight bending of the catch. In others, a few lugs and latches may be easily attached.

While a single flared lip 148 is shown in FIGS. 2 and 3, two or more flared lip portions may be provided. The glass may be of a thickness of from $1/16$ inch to $1/8$ inch or more in thickness.

In operation of the motion picture projector 10, the carbons 20 and 22 are positioned to strike an arc therebetween. Mechanism for this purpose is well known. Light from arc 24 radiates against the transparent reflector shield 36 or 136 and up to 5% or more will be reflected upon the film 46. The remainder of the light will pass through and will be reflected by mirror 32 so that it also impinges on the film 46. A much higher proportion of light will be reflected by the composite mirror and reflector shield upon the film than will be reflected by the mirror alone.

More importantly, any sputtering of carbon or metal from the carbons will be intercepted by the reflector shield 36 and will not reach the mirror 32. Due to the relatively low cost of the reflector shield, it can be replaced every few weeks and the maximum light output obtained at all times from the composite reflector.

To illustrate the benefits of the present invention a series of tests were conducted on a commercial outdoor motion picture projector employing a mirror 18 inches in diameter with its center 6½ inches from the arc. Because of the difficulty in determining the direct light output of the projector, tests were conducted using a light meter which was fastened in a fixed position on the projector, just below the lens. The projector was operated without any film and the light from the projector lens was reflected from a green panel at a distance of 30¼ inches from the light meter. None of these were varied at any time during the tests so that the comparative light meter readings would be sensitive solely to the mirror efficiency.

(1) With a new 18 inch mirror, with the carbons drawing 120 amperes, over a period of 5 minutes, the light meter gave a reading of 42½.

(2) Using the same mirror as in text (1), a concave reflector shield as shown in the drawing was applied, its center being 4 inches from the arc. With 120 amperes on the arc for a period of minutes, the light meter registered a value of 45.

(3) Using a mirror that had been used previously for some three months in the projector, under the test conditions as in (1), the meter reading was 32.5. This was nearly 25% reduction in light output.

(4) Applying the reflector shield to the used mirror in test (3), using the same test conditions as in (3), the meter reading was 40.

(5) Using the old mirror of test (3) with a flat plate of glass approximately 1½ inches from the arc, at 60 amperes, the light meter had a reading of 10. At 120 amperes, the light meter reading was approximately 20. The flat glass plate cracked in a few minutes so that the test could not be repeated.

Tests over a period of time established the great improvement of the composite reflector over the efficiency of the mirror alone.

These tests clearly indicate the substantial improvement in light output and protection afforded to the mirror by the present invention.

It will be appreciated that the above description and drawing are illustrative and not limiting.

I claim:

1. In an arc reflector, a composite reflector comprising a concave glass mirror disposed behind an electrical arc, an interposed transparent concave reflector shield of glass disposed in closely spaced position with respect to the mirror and of a size and shape so as to protect substantially all the surface of the mirror by intercepting any particles from the arc, the radius of curvature of the reflector shield being greater than but close to that of the concave mirror so that their centers are spaced apart whereby a high proportion of reflected arc light is focused by both at a given area, and means for passing cooling air within the spaced apart area between the mirror and reflector and over all surfaces of both.

2. In an arc reflector, a composite reflector comprising a concave glass mirror disposed behind an electrical arc, an interposed transparent concave reflector shield of glass disposed in closely spaced position with respect to the mirror and of a size and shape so as to protect substantially all of the surface of the mirror by intercepting any particles from the arc, the periphery of the reflector shield being separated slightly from the periphery of the mirror, the radius of curvature of the concave reflector shield being greater than but close to that of the concave mirror so that their centers are spaced further apart than their edges and whereby a high proportion of reflected arc light is focused by both at a given area, and means for passing cooling air between and over all surfaces of both, the cooling air escaping at least in part at the spaced peripheries.

3. In a motion picture projector, in combination, carbons for establishing an electrical arc, composite reflector means disposed behind the electrical arc and comprising a concave mirror of glass and an interposed transparent concave reflector shield of glass of substantially the size and shape of the mirror and of a slightly longer radius of curvature than the mirror whereby to protect the mirror from any particles projected from the arc, means for supporting the reflector shield with its periphery spaced slightly from the periphery of the mirror on the order of $1/8$ to $1/2$ inch and the centers being spaced further apart on the order of an inch, means enabling the rapid removal of the reflector shield, means for passing cooling air between the mirror and the reflector shield so that at least a part of the cooling air escapes at the peripheral separation.

4. In a motion picture projector, in combination, carbons for establishing an electrical arc, composite reflector means disposed behind the electrical arc and comprising a concave mirror of glass and an interposed transparent concave reflector shield of glass of substantially the size and shape of the mirror and of a slightly longer radius of curvature than the mirror whereby to protect the mirror from any particles projected from the arc, the reflector shield having a shallow flared lip extending longitudinally axially at its upper edge, means for supporting the reflector shield in position in front of the mirror, means enabling the rapid removal of the reflector shield, means for passing cooling air between the mirror and the reflector shield so that at least a part of the cooling air escapes at the flared lip.

References Cited in the file of this patent

UNITED STATES PATENTS

| | | |
|---|---|---|
| 253,770 | Sebillot | Feb. 14, 1882 |
| 513,052 | Ongley | Jan. 16, 1894 |
| 925,326 | Gilmore | June 15, 1909 |
| 961,114 | Forster | June 14, 1910 |
| 1,583,269 | Bart | May 4, 1926 |
| 1,665,410 | Fox | Apr. 10, 1928 |
| 1,681,153 | Johnston | Aug. 14, 1928 |
| 1,714,242 | Del Riccio | May 21, 1929 |
| 1,743,182 | Ashcraft | Jan. 14, 1930 |
| 2,075,539 | Nickelsburg et al. | Mar. 30, 1937 |
| 2,094,958 | Parker | Oct. 5, 1937 |
| 2,374,497 | Pophal | Feb. 19, 1944 |
| 2,550,783 | Corl | May 1, 1951 |
| 2,716,183 | Stebbins | Aug. 23, 1955 |
| 2,799,773 | Schwartz | July 16, 1957 |